(12) United States Patent
Lai et al.

(10) Patent No.: US 11,046,802 B2
(45) Date of Patent: Jun. 29, 2021

(54) SILICONE HYDROGEL COMPOSITION

(71) Applicant: PEGAVISION CORPORATION, Taoyuan (TW)

(72) Inventors: Yu-Chin Lai, Taoyuan (TW);
Ting-Chun Kuan, Taoyuan (TW);
Hsiang-Ho Kung, Taoyuan (TW);
Min-Tzung Yeh, Taoyuan (TW);
Ching-Wen Yang, Taoyuan (TW);
Tsung-Kao Hsu, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 0 days.

(21) Appl. No.: 16/889,768

(22) Filed: Jun. 1, 2020

(65) Prior Publication Data

US 2020/0291160 A1 Sep. 17, 2020

Related U.S. Application Data

(62) Division of application No. 15/888,100, filed on Feb. 5, 2018, now Pat. No. 10,793,659.

(30) Foreign Application Priority Data

May 25, 2017 (TW) .................. 106117451

(51) Int. Cl.

| C08F 230/08 | (2006.01) |
| C08F 290/04 | (2006.01) |
| G02B 1/04 | (2006.01) |
| C08F 290/06 | (2006.01) |
| C08G 18/81 | (2006.01) |
| C08G 18/24 | (2006.01) |
| C08G 18/28 | (2006.01) |
| C08L 51/00 | (2006.01) |
| C08L 51/08 | (2006.01) |

(52) U.S. Cl.
CPC ...... *C08F 290/046* (2013.01); *C08F 290/062* (2013.01); *C08F 290/068* (2013.01); *C08G 18/246* (2013.01); *C08G 18/289* (2013.01); *C08G 18/8116* (2013.01); *C08L 51/003* (2013.01); *G02B 1/041* (2013.01); *G02B 1/043* (2013.01); *C08L 51/085* (2013.01); *C08L 2201/54* (2013.01); *C08L 2203/02* (2013.01)

(58) Field of Classification Search
CPC .. C08F 230/08; C08L 51/085; C08L 2203/02; C08L 101/14
See application file for complete search history.

(56) References Cited

U.S. PATENT DOCUMENTS

| 5,115,056 A | 5/1992 | Mueller et al. |
| 5,177,165 A | 1/1993 | Valint et al. |
| 5,981,675 A | 11/1999 | Valint et al. |
| 2015/0011671 A1 | 1/2015 | Saxena et al. |

FOREIGN PATENT DOCUMENTS

| CN | 103168067 A | 6/2013 |
| CN | 104955878 A | 9/2015 |
| EP | 0559784 A1 | 9/1993 |
| EP | 2738221 A1 | 6/2014 |
| JP | H03-153726 A | 7/1991 |
| JP | 2007538113 A | 12/2007 |
| JP | 2011153298 A | 8/2011 |
| JP | 2012508902 A | 4/2012 |
| TW | 201402753 A | 1/2014 |
| WO | 03090805 A1 | 11/2003 |
| WO | 2012016097 A2 | 2/2012 |

*Primary Examiner* — Margaret G Moore
(74) *Attorney, Agent, or Firm* — CKC & Partners Co., LLC

(57) ABSTRACT

The present invention provides a silicone hydrogel composition. The silicone hydrogel composition includes a water-soluble silicone macromere, a hydrophilic monomer, a crosslinker, an initiator and an organic solvent. The water-soluble silicone macromere, the hydrophilic monomer, the crosslinker and the initiator is respectively in the amount of 50-80 wt %, 19-50 wt %, 0.1-1.5 wt % and 0.1-1 wt % based on the total weight of the silicone hydrogel composition.

7 Claims, 1 Drawing Sheet

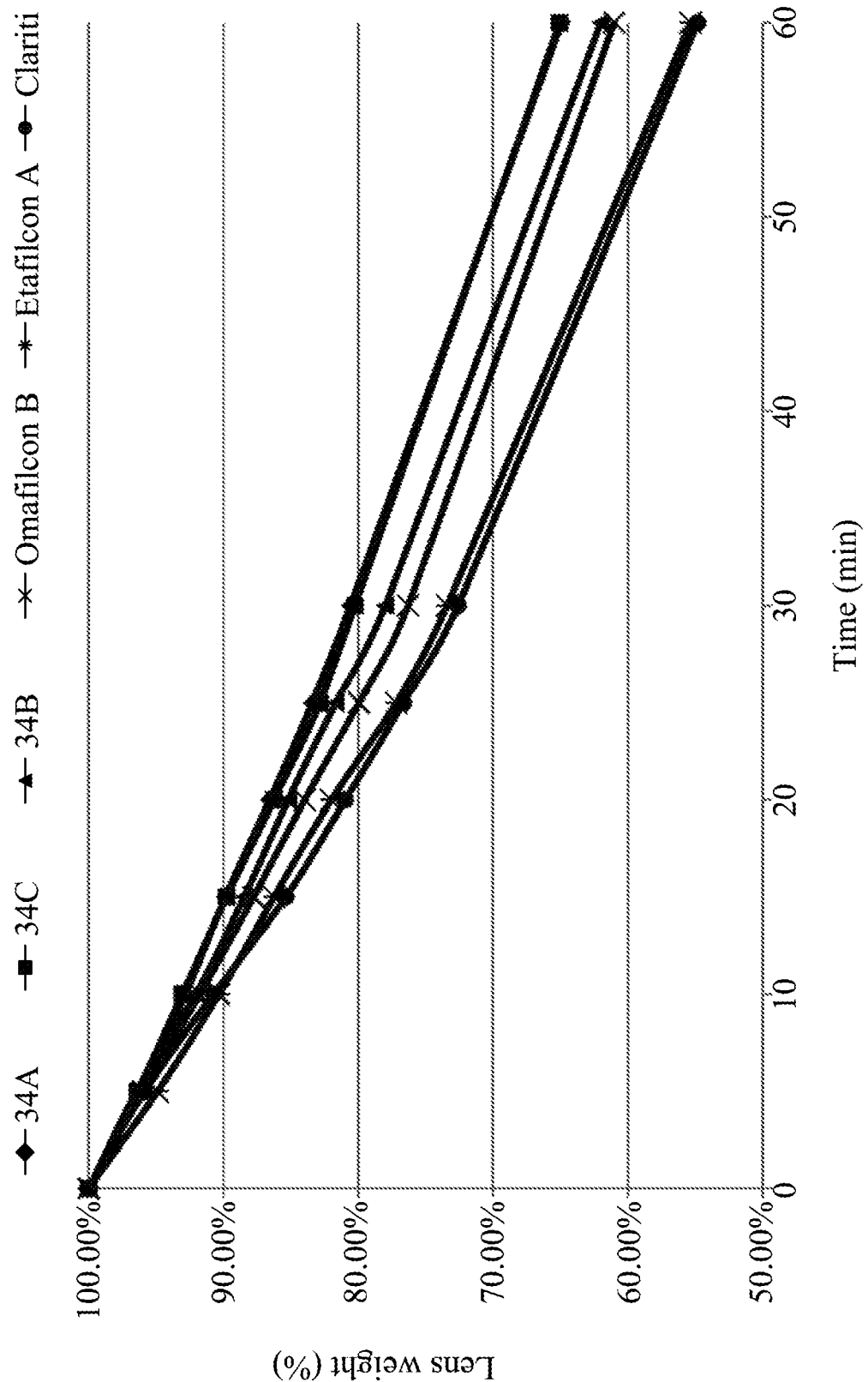

SILICONE HYDROGEL COMPOSITION

CROSS-REFERENCE TO RELATED APPLICATION

The present application is a Divisional Application of the application Ser. No. 15/888,100, filed Feb. 5, 2018, and now U.S. Pat. No. 10,793,659, the entire contents of which are hereby incorporated herein by reference, which claims priority to Taiwan Application Serial Number 106117451, filed May 25, 2017, all of which are herein incorporated by reference.

BACKGROUND

Field of Invention

The present invention relates to a silicone hydrogel composition.

Description of Related Art

Since contact lenses made from silicone hydrogel have high oxygen permeability, and allow sufficient oxygen to penetrate through the lenses to the cornea, thereby providing sufficient oxygen to the cornea. As such, the silicone hydrogel contact lenses may prevent eyes from irritation due to corneal hypoxia even after a prolonged wearing of the contact lenses. In this regard, silicone hydrogel has become one of the preferable components for making contact lenses.

Due to the hydrophobic character of silicones, if the uncured silicone hydrogel composition is not properly removed during the manufacturing process, lipids will likely precipitate on the lens surface, thereby causing blurred vision and other ocular complications.

To remove the uncured silicone hydrogel composition, it is necessary to extract that from the lens using organic solvent. In most cases, isopropanol is used as the solvent. Using isopropanol to treat the silicone hydrogel lens causes not only an environmental problem, but also a safety problem because of the low flask point of the isopropanol. In addition, the extraction using organic solvent increases the manufacturing cost of the silicone hydrogel lenses.

SUMMARY

In view of the foregoing problems with the prior art, the present invention provides a novel water-soluble silicone macromer and a silicone hydrogel composition containing the water-soluble silicone macromer. In the process of manufacturing the silicone hydrogel contact lens by the silicone hydrogel composition, the uncured silicone hydrogel composition can be removed completely with water only and it is not necessary to use organic solvent. In addition, the silicone hydrogel contact lenses still remain high transparency, high oxygen permeability and high moisturizing capability when wearing them. The silicone macromer is a silicone polymer having a polymerizable ethylene functional group and a molecular weight of at least 600.

One aspect of the present invention provides a water-soluble silicone macromer having a structure of formula (1) below:

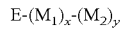  formula (1)

wherein $M_1$ is a repeating unit derived from a silicone containing monomer, and $M_1$ is in an amount of 30-60 wt % based on the total weight of the water-soluble silicone macromere; $M_2$ is a repeating unit derived from a first hydrophilic monomer, and $M_2$ is in an amount of 40-70 wt % based on the total weight of the water-soluble silicone macromer; E is a group derived from an ethylenically unsaturated compound; x is an integer of 1-20, y is an integer of 1-20, and the average molecular weight of the water-soluble silicone macromer ranges from 2000 to 5000.

According to one embodiment of the present invention, the silicone containing monomer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane, monofunctional polydimethylsiloxane having a number-averaged molecular weight of less than 1500, and a combination thereof, wherein the monofunctional polydimethylsiloxane has a structure of formula (10) or (11):

formula (10)

formula (11)

wherein p is an integer of 0-4, q is 0 or 1, k is an integer of 4-20, and $R_2$ is C1-C10 alkyl group.

According to another embodiment of the present invention, the first hydrophilic monomer is selected from the group consisting of N,N-dimethyl acrylamide, N,N-diethyl acrylamide, N-isopropyl acrylamide, N-vinyl pyrrolidone, N-vinyl-N-methyl acetamide, 2-hydroxyethyl methacrylate, glycerol methacrylate, polyethylene glycol methacrylate mono methyl ether of molecular weight less than 1000, and a combination thereof.

According to another embodiment of the present invention, the ethylenically unsaturated compound is selected from the group consisting of acryloyl chloride, acrylic acid, methacrylic acid, glyceryl methacrylate, isocyanatoethyl methacrylate, isocyanatoethyl acrylate and a combination thereof.

According to another embodiment of the present invention, the first hydrophilic monomer is polyethylene glycol methacrylate mono methyl ether having a molecular weight of less than 1000, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane and a combination thereof.

According to another embodiment of the present invention, the first hydrophilic monomer is polyethylene glycol methacrylate mono methyl ether having a molecular weight of less than 500, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane and a combination thereof.

According to another embodiment of the present invention, the first hydrophilic monomer is N,N-dimethyl acrylamide, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane, monofunctional polydimethylsiloxane of number-averaged molecular weight of less than 1500, and a combination thereof, wherein the monofunctional polydimethylsiloxane has a structure of formula (10) or (11):

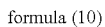
formula (10)

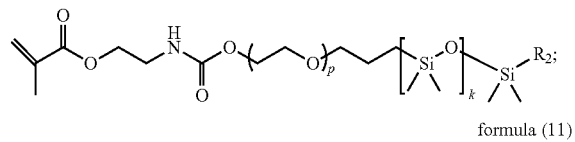
formula (11)

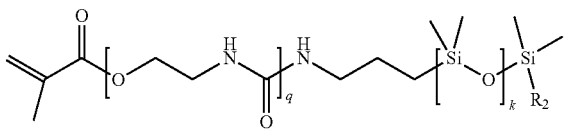

wherein p is an integer of 0-4, q is 0 or 1, k is an integer of 4-20, and $R_2$ is C1-C10 alkyl group.

According to another embodiment of the present invention, the first hydrophilic monomer is N-vinyl pyrrolidone, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane, monofunctional polydimethylsiloxane having a number-averaged molecular weight of less than 1500, and a combination thereof, wherein the monofunctional polydimethylsiloxane has a structure of formula (10) or (11):

formula (10)

formula (11)

wherein p is an integer of 0-4, q is 0 or 1, k is an integer of 4-20, and $R_2$ is C1-C10 alkyl group.

According to another embodiment of the present invention, the first hydrophilic monomer is N-isopropyl acrylamide, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane, monofunctional polydimethylsiloxane having a number-averaged molecular weight of less than 1500, and a combination thereof, wherein the monofunctional polydimethylsiloxane has a structure of formula (10) or (11):

formula (10)

formula (11)

wherein p is an integer of 0-4, q is 0 or 1, k is an integer of 4-20, and $R_2$ is C1-C10 alkyl group.

According to another embodiment of the present invention, the first hydrophilic monomer is N,N-diethyl acrylamide, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane, monofunctional polydimethylsiloxane having a number-averaged molecular weight of less than 1500, and a combination thereof, wherein the monofunctional polydimethylsiloxane has a structure of formula (10) or (11):

formula (10)

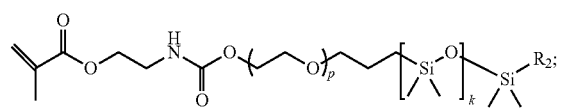

-continued

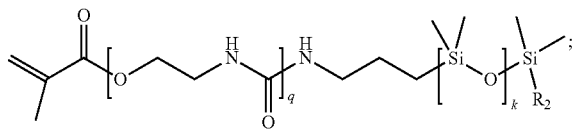

formula (11)

wherein p is an integer of 0-4, q is 0 or 1, k is an integer of 4-20, and $R_2$ is C1-C10 alkyl group.

According to another embodiment of the present invention, the first hydrophilic monomer is a collection of polyethylene glycol methacrylate mono methyl ether having a molecular weight of less than 500 and N,N-dimethyl acrylamide, and the silicone containing macromer is selected from the group consisting of 3-methacryloxypropyl tris(trimethylsiloxy)silane, 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane, 3-vinyl carbamatepropyl tris(trimethylsiloxy)silane, (3-methacryloxy-2-hydroxypropoxy) propylbis (trimethylsiloxy) methylsilane and, a combination thereof.

According to another embodiment of the present invention, the first hydrophilic monomer is selected from the group consisting of N,N-dimethyl acrylamide, N,N-diethyl acrylamide, N-isopropyl acrylamide, N-vinyl pyrrolidone, N-vinyl-N-methyl acetamide, 2-hydroxyethyl methacrylate, glycerol methacrylate and a combination thereof, and the silicone containing macromer comprises a combination of monofunctional polydimethylsiloxane having a number-averaged molecular weight of less than 1500, and either 3-methacryloxypropyl tris(trimethylsiloxy)silane or (3-methacryloxy-2-hydroxypropoxy) propylbis (trimethylsiloxy) methylsilane has a structure of formula (10) or (11):

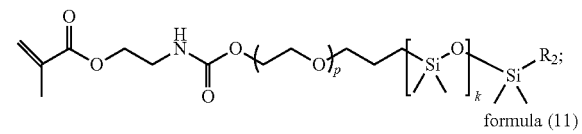

formula (10)

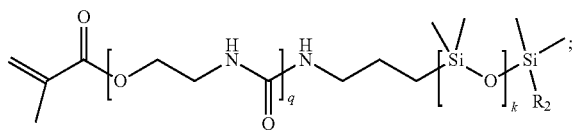

formula (11)

wherein p is an integer of 0-4, q is 0 or 1, k is an integer of 4-20, and $R_2$ is C1-C10 alkyl group.

According to another embodiment of the present invention, an aqueous solution composed of 0.5 wt % of the water-soluble silicone macromere and water has a light transmittance of greater than 20% at a wavelength of 450 nm.

Another aspect of the present invention provides a silicone hydrogel composition, comprising the water-soluble silicone macromer, a second hydrophilic monomer, a crosslinker, a initiator and organic solvent.

According to one embodiment of the present invention, the second hydrophilic monomer is selected from the group consisting of N,N-dimethyl acrylamide (DMA), N,N-diethyl acrylamide (DEA), N-Isopropylacrylamide (NIPAM), N-vinyl pyrrolidone (NVP), N-vinyl-N-methyl acetamide (VMA), 2-hydroxyethyl methacrylate (HEMA), glycerol methacrylate (GMA), methacrylic acid (MAA), acrylic acid (AA), Acryloyl morpholine (ACMO), 2-methacryloyloxyethyl phosphorylcholine (MPC), and a combination thereof.

According to another embodiment of the present invention, the crosslinker is selected from the group consisting of ethylene glycol di(meth)acrylate (EGDMA), triethylene glycol di(meth)acrylate, tetraethylene glycol di(meth)acrylate (TEGDMA), trimethylolpropane tri(meth)acrylate (TMPTMA), pentaerythritol tetra(meth)acrylate (TMAPMA), bisphenol A di(meth)acrylate, methylenebis (meth)acrylamide, divinyl ether, divinyl sulfone, divinylbenzene, trivinylbenzene, triallyl isocyanurate (TAIC), triallyl phthalate, diallyl phthalate, allyl methacrylate (AMA), and a combination thereof.

According to another embodiment of the present invention, the initiator is photo initiator or thermal initiator.

According to another embodiment of the present invention, the organic solvent is selected from the group consisting of n-butanol, t-butanol, n-pentyl alcohol, t-amyl alcohol, n-hexanol, 3-methoxy-1-butanol, methyl cabitol, ethyl carbitol, propyl carbitol, butyl carbitol, and a combination thereof.

According to another embodiment of the present invention, the water-soluble silicone macromer is in an amount of 50-80 wt % based on the total weight of the silicone hydrogel composition, the second hydrophilic monomer is in an amount of 19-50 wt % based on the total weight of the silicone hydrogel composition, the crosslinker is in an amount of 0.1-1.5 wt % based on the total weight of the silicone hydrogel composition, and the initiator is in an amount of 0.1-1 wt % based on the total weight of the silicone hydrogel composition.

According to another embodiment of the present invention, the silicone hydrogel composition further comprises a tint monomer or a tint compound.

According to another embodiment of the present invention, the silicone hydrogel composition further comprises UV-blocking monomer, and the UV-blocking monomer is a benzotriazole-type monomer.

Another aspect of the present invention provides a silicone hydrogel contact lens made by crosslinking and curing the silicone hydrogel composition.

Another aspect of the present invention provides a silicone hydrogel contact lens, which is made of a water-soluble silicone macromer, having a water content of 52-72% and an oxygen permeability of 50-75 DK.

Another aspect of the present invention provides a silicone hydrogel contact lens, which is made of a water-soluble silicone macromer using a photo curing process, and after the photo curing process, the silicone hydrogel contact lens is free of extraction using organic solvent.

Another aspect of the present invention provides a method for manufacturing the silicone hydrogel contact lenses, comprising providing the silicone hydrogel composition, crosslinking and a curing the silicone hydrogel composition to form a silicone hydrogel contact lens, and extracting an uncured portion of the water-soluble silicone macromer in the silicone hydrogel contact lens using a liquid comprising water to remove the uncured portion of the water-soluble silicone macromer.

According to one embodiment of the present invention, liquid comprising water further comprises a surfactant having a hydrophilic-lipophilic balance between 13 and 17.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a line graph showing the weight decrease trend of the silicone hydrogel lenses in the present invention, some silicone hydrogel lenses and hydrogel lenses on the market.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

One aspect of the present invention provides a water-soluble silicone macromer. The water-soluble silicone macromer comprises a repeating unit which is derived from a silicone containing monomer, a repeating unit which is derived from a first hydrophilic monomer and a group which is derived from an ethylenically unsaturated compound.

The water-soluble silicone macromer has a structure presented by formula (1):

formula (1)

According to various embodiments of the present invention, $M_1$ is a repeating unit which is derived from a silicone containing monomer, having a molecular weight in a range of 300-1500, for example: 438, 453, 658, 776, 880, 954, 1027, 1177, 1250, 1325, 1472, and 1487. In some embodiments, $M_1$ has a structure of formula (2)-(9):

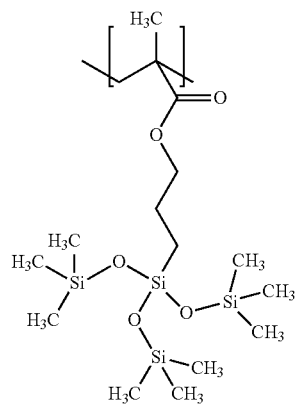

formula (2)

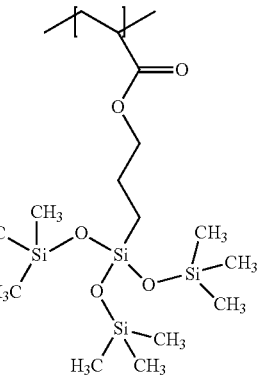

formula (3)

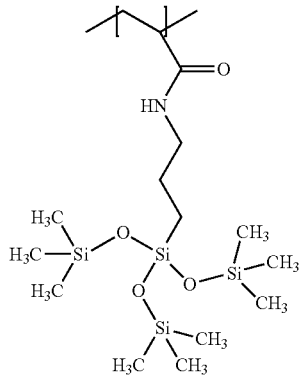

formula (4)

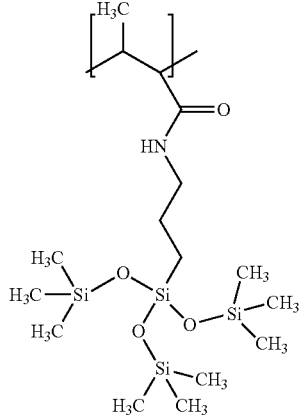

formula (5)

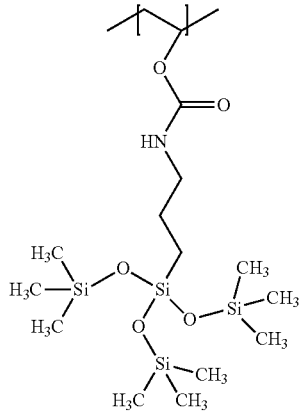

formula (6)

formula (7)

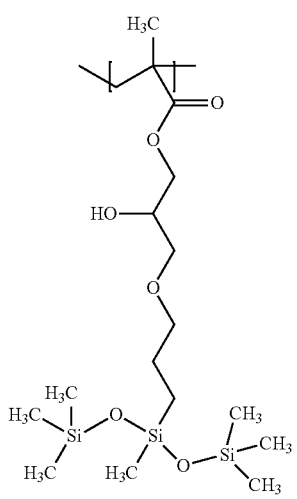

formula (8)

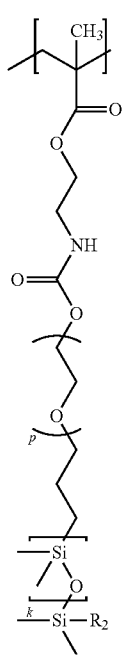

formula (9)

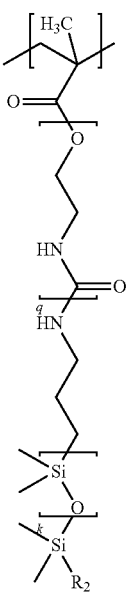

wherein p is an integer of 0-4, q is 0 or 1, k is an integer of 4-20, and $R_2$ is C1-C10 alkyl group.

In some embodiments, the silicone containing monomer is selected from the group consisting of 3-methacryloxypropyl tris(trimethylsiloxy)silane (TRIS), 3-acryloxypropyl tri(trimethylsiloxy)silane, 3-acrylamidopropyl tris(trimethylsiloxy)silane, 3-methacrylamidopropyl tris(trimethylsiloxy)silane, 3-vinyl carbamatepropyl tris(trimethylsiloxy)silane (TRISVC), (3-methacryloxy-2-hydroxypropoxy) propylbis(trimethylsiloxy) methylsilane (SiGMA), monofunctional polydimethylsiloxane of number-averaged molecular weight less than 1500 and a combination thereof, wherein the monofunctional polydimethylsiloxane of number-averaged molecular weight less than 1500 having a structure of formula (10) or (11):

formula (10)

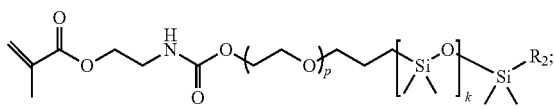

formula (11)

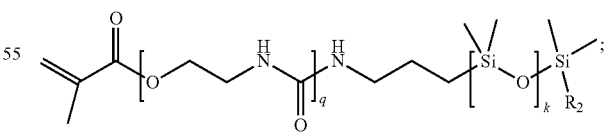

wherein p is an integer of 0-4; q is 0 or 1, k is an integer of 4-20, $R_2$ is C1-C10 alkyl group, preferably a butyl group, and the formula (10) has a carbamate bond, the formula (11) has a urea bond.

In some embodiments, $M_2$ in the formula (1) is a repeating unit which is derived from a first hydrophilic monomer, having the structure of the formula (12)-(19):

formula (12)
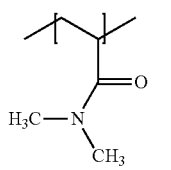

formula (13)
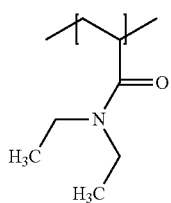

formula (14)
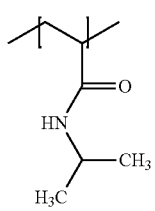

formula (15)
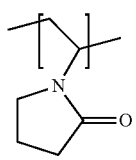

formula (16)
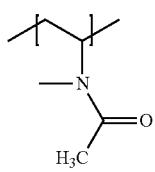

formula (17)
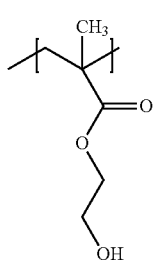

formula (18)
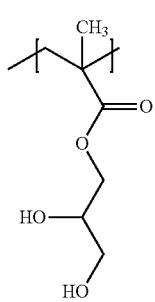

formula (19)
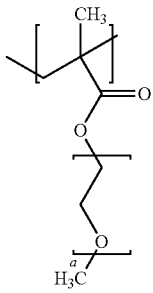

wherein a is an integer of 1-21.

In some embodiments, the first hydrophilic monomer is selected from the group consisting of N,N-dimethyl acrylamide (DMA), N,N-diethyl acrylamide (DEA), N-isopropyl acrylamide (NIPAM), N-vinyl pyrrolidone (NVP), N-vinyl-N-methyl acetamide (VMA), 2-hydroxyethyl methacrylate (HEMA), glycerol methacrylate (GMA) polyethylene glycol methacrylate mono methyl ether of molecular weight less than 1000 and a combination thereof.

In some embodiments, E is a group which is derived form an ethylenically unsaturated compound. In some embodiments, E has the structure of the structure of the formula (20)-(23):

formula (20)
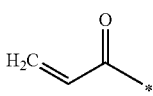

formula (21)
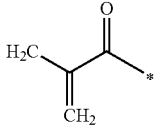

formula (22)
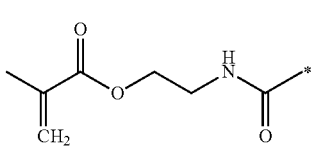

formula (23)
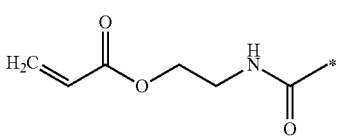

wherein the symbol "*" in formula (20)-(23) indicates the position to be linked to $M_1$.

In some embodiments, the ethylenically unsaturated compound is selected from the group consisting of acryloyl chloride, acrylic acid (AA), methacrylic acid (MAA), glyceryl methacrylate (GMA), isocyanatoethyl methacrylate (IEM), isocyanatoethyl acrylate (IEA) and a combination thereof.

In the formula (1), x is an integer of 1-20, y is an integer of 1-20. According to the embodiment of present invention, the average molecular weight of the water-soluble silicone macromer is in a range of 2000-5000, for example, 2000, 3000, 3500, 4000, 4500, and 4700.

In some embodiments, the repeating unit which is derived from a silicone containing monomer is in the amount of 30-60 wt % based on the total weight of the water-soluble silicone macromer, for example, 35, 40, 45, 50 and 55 wt %, and the repeating unit which is derived from a first hydrophilic monomer is in the amount of 40-70 wt % based on the total weight of the water-soluble silicone macromer, for example, 45, 50, 55, 60 and 65 wt %.

In some embodiments, providing a method for the preparation of the water-soluble silicone macromer, the synthetic scheme is shown in formula (24) and (25):

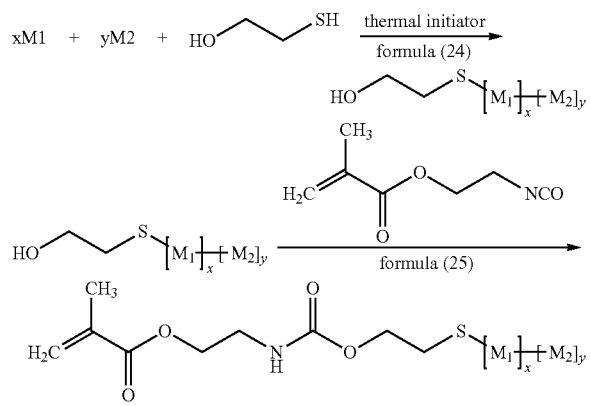

First, as shown in formula (24), a hydroxyl-terminated copolymer is synthesized. The silicone containing monomer (M1'), the first hydrophilic monomer (M2') and the chain-transfer agent (mercaptoethanol) were dissolved in a solvent. The thermal initiator was added to the solution and the polymerization was carried out at 60-80° C. The hydroxyl-terminated copolymer is end-capped with the chain-transfer agent. The number-averaged molecular weight (Mn) of the hydroxyl-terminated copolymer can be determined by the moles ratio of the silicone containing monomer and the first hydrophilic monomer to the chain-transfer agent.

In some embodiments, the thermal initiator comprises Vazo® 52, Vazo® 64 (Azo isobutyl nitrile, AIBN), Vazo® 67, Luperox® 225 and Luperox® 256, which have 10 hours half-life at 52, 64, 67, 51 and 73° C. respectively.

In some embodiments, for the consideration of the water solubility of the water-soluble silicone macromer and the oxygen permeability of the final silicone hydrogel lens, the weight ratio of the hydrophilic monomer to the silicone containing monomer is in a range of 70/30 to 50/50, for example, 65/35, 60/40 and 55/45.

Second, as shown in formula (25), a water-soluble silicone macromer is synthesized. The hydroxyl-terminated copolymer and a catalyst were dissolved in a solvent, and an ethylenically unsaturated compound was added in the solution. Then, the end-capping reaction was carried out at ambient temperature. According to the embodiment of the present invention, the catalyst comprises Dabco® and dibutyltin dilaurate.

In some embodiments, the method for measuring the water solubility of the water-soluble silicone macromer is described as follows. Preparing a 0.5% water-soluble silicone macromer aqueous solution, shaked and then settled for overnight. If the solution was separated into two clear phase, the water-soluble silicone macromer is insoluble in water. If the solution was not phase-separated and showed different degree of clarity/haziness, the transmittance of the 0.5% solution was measured at 450 nm and classified into four different levels as shown in Table 1.

TABLE 1

| Level of water solubility | Visual appearance | transmittance at 450 nm (%) |
|---|---|---|
| I | Clear | >90 |
| II | Clear | 51-89 |
| III | whitish hazy | 20-50 |
| IV | whitish cloudy | <20 |

Water-soluble silicone macromer having more 20% or better transmittance in Table 1 is considered to have sufficient water-solubility in the process of manufacturing the silicone hydrogel lenses by the water-soluble silicone macromer, so the uncured water-soluble silicone macromer can be removed completely with water extraction and it is unnecessary to use organic solvent.

In some embodiments, the water solubility of the water-soluble silicone macromer can be increased by adding a surfactant with Hydrophilic-lipophilic balance (HLB) of 13-17, for example, Triton™ X-100, Tween® 21, Tween® 80 and TERGITOL™ 15-S-30, which has a HLB of 13.51, 13.3, 15 and 17.4 respectively.

According to the embodiment of the present invention, the transmittance of a 0.5 wt % water-soluble silicone macromer aqueous solution at 450 nm is greater than 20%.

Another aspect of the present invention provides a silicone hydrogel composition, comprising the water-soluble silicone macromer, a second hydrophilic monomer, a cross-linker, an initiator and organic solvent.

According to various embodiments of the present invention, the water-soluble silicone macromer is in the amount of 50-80 wt % based on the total weight of the silicone hydrogel composition, for example, 55, 60, 65, 70 and 75 wt %.

In some embodiments, the second hydrophilic monomer is selected from the group consisting of N, N-dimethyl acrylamide (DMA), N,N-diethyl acrylamide (DEA), N-Isopropylacrylamide (NIPAM), N-vinyl pyrrolidone (NVP), N-vinyl-N-methyl acetamide (VMA), 2-hydroxyethyl methacrylate (HEMA), 3-hydroxypropyl methacrylate (HPMA), glycerol methacrylate (GMA), methacrylic acid (MAA), acrylic acid (AA), Acryloyl morpholine (ACMO), 2-methacryloyloxyethyl phosphorylcholine (MPC) and a combination thereof. In some embodiments of the present invention, the second hydrophilic monomer is in the amount of 19-50 wt % based on the total weight of the silicone hydrogel composition, for example, 20, 25, 30, 35, 40 and 45 wt %.

In some embodiments, the crosslinker is selected from the group consisting of ethylene glycol dimethacrylate (EGDMA), triethylene glycol dimethacrylate, tetraethylene glycol dimethacrylate (TEGDMA), trimethylolpropane trimethacrylate (TMPTMA), pentaerythritol tetramethacrylate (TMAPMA), bisphenol A dimethacrylate, methylenebis (methacrylamide), divinyl ether, divinyl sulfone, divinylbenzene, trivinylbenzene, triallyl isocyanurate (TAIC), triallyl phthalate, diallyl phthalate, allyl methacrylate (AMA) and a combination of thereof. In some embodiments of the present invention, the crosslinker is in the amount of 0.5-1.5 wt % based on the total weight of the silicone hydrogel composition, for example, 0.4, 0.5, 0.6, 0.8, 1, 1.2 and 1.3 wt %.

In some embodiments, the Initiator is photo-initiator or thermal initiator. In some embodiments, the photo-initiator comprises Darocur® 1173, Irgacure® 184, Irgacure® TPO, Irgacure® 1700, Irgacure® 1800, Irgacure® 1850 and Irgacure® 819, and the thermal initiator comprises Vazo® 64 and Vazo® 67. In some embodiments, the initiator is in the amount of 0.1-1 wt % based on the total weight of the silicone hydrogel composition, for example, 0.2, 0.5, 0.7 and 0.9 wt %.

In some embodiments, the organic solvent is selected from the group consisting of n-butanol, t-butanol, n-pentyl alcohol, t-amyl alcohol, n-hexanol, 3-methoxy-1-butanol, methyl cabitol, ethyl carbitol, propyl carbitol, butyl carbitol and a combination of thereof. In some embodiments, the organic solvent is in the amount of 0.1-40 wt % based on the total weight of the silicone hydrogel composition, for example, 2, 5, 10, 20 and 30 wt %.

According to the embodiment of the present invention, the silicone hydrogel composition further comprises a tint monomer or a tint compound.

According to the embodiments of the present invention, the silicone hydrogel composition further comprises an UV-blocking monomer. In some embodiments, the UV-blocking monomer is a benzotrizole-type monomer. In some embodiments, the UV-blocking monomer is in the amount of 0.1-1.5 wt % based on the total weight of the silicone hydrogel composition, for example, 0.5, 0.8, 1.0 and 1.4 wt %.

Another aspect of the present invention, providing a silicone hydrogel lens. According to various embodiments of the present invention, the silicone hydrogel lens is made of the silicone hydrogel composition through crosslinking and curing reaction.

Another aspect of the present invention, providing a method of manufacturing the silicone hydrogel lenses. In some embodiments, the method comprises (i) injecting a silicone hydrogel composition into a mold, (ii) curing and crosslinking the silicone hydrogel composition under a light source to form a silicone hydrogel lenses, (iii) extracting the silicone hydrogel lenses with aqueous solution to remove the uncured water-soluble silicone macromer, (iv) placing the silicone hydrogel lenses in borate buffered saline of pH 7.1-7.5 and autoclaving. According to the method of manufacturing the silicone hydrogel lenses, the uncured water-soluble silicone macromer can be removed without organic solvent extraction.

In some embodiments, the aqueous solution comprises a surfactant with HLB from 13 to 17. In some embodiments, the extraction efficiency was enhanced by utilizing the aqueous solution containing a surfactant.

According to the embodiment of the present invention, the surfactant with HLB from 13 to 17 comprises Triton™ X-100, Tween® 21, Tween® 80 and TERGITOL™ 15-S-30.

In the following examples, the silicone hydrogel lenses made by the above manufacturing method were characterized for water content, oxygen permeability and % elongation. Water content was measured by thermogravimetric method. Oxygen permeability was measured by polarography method. The % elongation was measured by a fixed length lens sample, fixed one end and stretched at the other end with a constant force until the lens broke.

% Elongation=(length while the lens break)−(original length of lens)/original length of lens×100.

Since the silicone hydrogel contact lenses on the market in 1999, the silicone hydrogel contact lenses have the following characteristics: the water content of 24-70%, the oxygen permeability of 45-140 DK (1 DK=$10^{-11}$($cm^3$ $O_2$)cm $cm^{-2}$ $s^{-1}$ $mmHg^{-1}$), and the elongation (%) is 100% or more.

Example 1: Preparing the Hydroxyl-Terminated Copolymer 1

8.4 g (3-methacryloxy-2-hydroxypropoxy) propylbis(trimethylsiloxy) methylsilane (SiGMA), 19.9 g polyethylene glycol methacrylate monomethyl ether of 500 (EO9), 0.78 g mercaptoethanol and 30 ml THF were put into a 250 ml dried 3-necked round bottom flask equipped with a reflux condenser and a nitrogen inlet tube; after flushed with nitrogen for 30 minutes, the contents were heated to 80° C. with magnetic stirring; then 0.0283 g Vazo 64(AIBN) was added and the contents was kept stirring under reflux for 40 hours; the contents was cooled and the solvent was stripped off, and the crude product was purified and dried. The product was analyzed by GPC, the mean average molecular (Mn) was 3789 and the structure was confirmed by NMR.

During the polymerization, the progress was followed by FTIR for the peak around 1640 $cm^{-1}$ for the decrease and disappearance of this peak.

In the hydroxyl-terminated copolymer 1, the weight ratio of SiGMA/EO9 was 30/70, and the target Mn was 3000.

Example 2: Preparing the Water-Soluble Silicone Macromer 1

7.4 g hydroxyl-terminated copolymer 1, 0.04 g dibutyltin dilaurate, 0.0008 g methylhydroquinone, and 8 mL THF were put into a 250 ml dried 3-necked round bottom flask equipped with a reflux condenser and a nitrogen inlet tube; after flushed with nitrogen for 30 minutes, 0.326 g isocyanatoethyl methacrylate was added drop by drop over a period of 10 minutes, the contents were stirred with magnetic stirring; after 20 hours the reaction was completed; the solvent was then stripped off and the crude product was purified and dried. The product was analyzed by GPC, the Mn was 3850 and the structure was confirmed by NMR. In the water-soluble silicone macromer 1, the weight ratio of SiGMA/EO9 was 30/70.

During the reaction, the progress was followed by FTIR for the peak around 2230 $cm^{-1}$ for the decrease and disappearance of this peak.

Example 3: Preparing the Hydroxyl-Terminated Copolymer 2

The preparation of the hydroxyl-terminated copolymer 2 was carried out in the same manner as the Example 1, except the weight ratio of SiGMA/EO9 was adjusted to 35/65.

Example 4: Preparing the Water-Soluble Silicone Macromer 2

The preparation of the water-soluble silicone macromer 2 was carried out in the same manner as the Example 2, except the hydroxyl-terminated copolymer 1 was replaced by hydroxyl-terminated copolymer 2.

Example 5: Preparing the Hydroxyl-Terminated Copolymer 3

The preparation of the hydroxyl-terminated copolymer 3 was carried out in the same manner as the Example 1, except the weight ratio of SiGMA/EO9 was adjusted to 40/60.

Example 6: Preparing the Water-Soluble Silicone Macromer 3

The preparation of the water-soluble silicone macromer 3 was carried out in the same manner as the Example 2, except the hydroxyl-terminated copolymer 1 was replaced by hydroxyl-terminated copolymer 3.

Example 7: Preparing the Hydroxyl-Terminated Copolymer 4

The preparation of the hydroxyl-terminated copolymer 4 was carried out in the same manner as the Example 5, except the weight ratio of SiGMA/EO9 was adjusted to 45/55.

Example 8: Preparing the Water-Soluble Silicone Macromer 4

The preparation of the water-soluble silicone macromer 4 was carried out in the same manner as the Example 6, except the hydroxyl-terminated copolymer 3 was replaced by hydroxyl-terminated copolymer 4.

Example 9: Preparing the Hydroxyl-Terminated Copolymer 5

The preparation of the hydroxyl-terminated copolymer 5 was carried out in the same manner as the Example 5, except the target Mn was 5000.

Example 10: Preparing the Water-Soluble Silicone Macromer 5

The preparation of the water-soluble silicone macromer 5 was carried out in the same manner as the Example 6, except the hydroxyl-terminated copolymer 3 was replaced by hydroxyl-terminated copolymer 5 and the addition amount of isocyanatoethyl methacrylate.

Example 11: Preparing the Hydroxyl-Terminated Copolymer 6

The preparation of the hydroxyl-terminated copolymer 6 was carried out in the same manner as the Example 1, except SiGMA was replaced by TRIS, and the weight ratio of TRIS/EO9 was adjusted to 30/70 and the target Mn was 3000.

Example 12: Preparing the Water-Soluble Silicone Macromer 6

The preparation of the water-soluble silicone macromer 6 was carried out in the same manner as the Example 2, except the hydroxyl-terminated copolymer 1 was replaced by hydroxyl-terminated copolymer 6.

Example 13: Preparing the Hydroxyl-Terminated Copolymer 7

The preparation of the hydroxyl-terminated copolymer 7 was carried out in the same manner as the Example 11, except the weight ratio of TRIS/EO9 was adjusted to 35/65.

Example 14: Preparing the Water-Soluble Silicone Macromer 7

The preparation of the water-soluble silicone macromer 7 was carried out in the same manner as the Example 12, except the hydroxyl-terminated copolymer 6 was replaced by hydroxyl-terminated copolymer 7.

Example 15: Preparing the Hydroxyl-Terminated Copolymer 8

The preparation of the hydroxyl-terminated copolymer 8 was carried out in the same manner as the Example 11, except the weight ratio of TRIS/EO9 was adjusted to 40/60.

Example 16: Preparing the Water-Soluble Silicone Macromer 8

The preparation of the water-soluble silicone macromer 8 was carried out in the same manner as the Example 12, except the hydroxyl-terminated copolymer 6 was replaced by hydroxyl-terminated copolymer 8.

Example 17: Preparing the Hydroxyl-Terminated Copolymer 9

The preparation of the hydroxyl-terminated copolymer 9 was carried out in the same manner as the Example 11, except the weight ratio of TRIS/EO9 was adjusted to 45/55.

Example 18: Preparing the Water-Soluble Silicone Macromer 9

The preparation of the water-soluble silicone macromer 9 was carried out in the same manner as the Example 12, except the hydroxyl-terminated copolymer 6 was replaced by hydroxyl-terminated copolymer 9.

Example 19: Preparing the Hydroxyl-Terminated Copolymer 10

The preparation of the hydroxyl-terminated copolymer 10 was carried out in the same manner as the Example 11, except the target Mn was 5000.

Example 20: Preparing the Water-Soluble Silicone Macromer 10

The preparation of the water-soluble silicone macromer 10 was carried out in the same manner as the Example 12, except the hydroxyl-terminated copolymer 6 was replaced by hydroxyl-terminated copolymer 10.

Example 21: Preparing the Hydroxyl-Terminated Copolymer 11

The preparation of the hydroxyl-terminated copolymer 11 was carried out in the same manner as the Example 13, except the target Mn was 5000.

Example 22: Preparing the Water-Soluble Silicone Macromer 11

The preparation of the water-soluble silicone macromer 11 was carried out in the same manner as the Example 14, except the hydroxyl-terminated copolymer 7 was replaced by hydroxyl-terminated copolymer 11.

Example 23: Preparing the Hydroxyl-Terminated Copolymer 12

The preparation of the hydroxyl-terminated copolymer 12 was carried out in the same manner as the Example 5, except EO9 was replaced by N,N-dimethyl acrylamide.

Example 24: Preparing the Water-Soluble Silicone Macromer 12

The preparation of the water-soluble silicone macromer 12 was carried out in the same manner as the Example 6, except the hydroxyl-terminated copolymer 3 was replaced by hydroxyl-terminated copolymer 12.

Example 25: Preparing the Hydroxyl-Terminated Copolymer 13

The preparation of the hydroxyl-terminated copolymer 13 was carried out in the same manner as the Example 23, except SiGMA was replaced by monofunctional polydimethylsiloxane macromer of formula (10), and the weight ratio of monofunctional polydimethylsiloxane macromer/N,N-dimethyl acrylamide was 35/65.

Example 26: Preparing the Water-Soluble Silicone Macromer 13

The preparation of the water-soluble silicone macromer 13 was carried out in the same manner as the Example 24, except the hydroxyl-terminated copolymer 12 was replaced by hydroxyl-terminated copolymer 13.

Example 27: Preparing the Hydroxyl-Terminated Copolymer 14

The preparation of the hydroxyl-terminated copolymer 14 was carried out in the same manner as the Example 15, except a portion of EO9 was replaced by N,N-dimethyl acrylamide, and the weight ratio of TRIS/EO9/N,N-dimethyl acrylamide was 40/40/20.

Example 28: Preparing the Water-Soluble Silicone Macromer 14

The preparation of the water-soluble silicone macromer 14 was carried out in the same manner as the Example 16, except the hydroxyl-terminated copolymer 8 was replaced by hydroxyl-terminated copolymer 14.

Example 29: Water Solubility of the Water-Soluble Silicone Macromer

The light transmittance of 1%, 0.5%, 0.1% water-soluble silicone macromer aqueous solution and 0.5% water-soluble silicone macromer aqueous solution with 300 ppm Triton™ X-100 at 450 nm were measured by a UV/VIS spectroscopy. The 1% water-soluble silicone macromer aqueous solution was prepared by added 0.1 g water-soluble silicone macromer to 10 ml water and stirred for 3 hours. The measurement result of the above water-soluble silicone macromer are shown in Table 2:

TABLE 2

| Water-soluble silicone macromer (Example) | Concentration | | | |
|---|---|---|---|---|
| | 1% | 0.50% | 0.50% with 0.03% x-100 | 0.10% |
| 2 | 97.60% | 98.36% | — | 99.36% |
| 4 | 55.70% | 96.79% | — | 99.16% |
| 6 | 23.40% | 35.04% | 41.19% | 79.57% |
| 8 | — | 13.84% | 18.34% | 65.44% |
| 10 | 21% | 27.75% | 74.89% | 80.75% |
| 12 | 30.60% | 63.76% | — | 89.22% |
| 14 | 12.03% | 26.00% | 38.36% | 83.90% |
| 16 | 11.40% | 25.53% | 36.09% | 70.40% |
| 18 | — | 13.06% | 19.34% | 58.65% |
| 20 | 20% | 58.65% | 92.84% | 90.19% |
| 24 | — | 2.51% | 10.71% | 23.17% |
| 26 | 34.80% | 82.98% | — | 92.20% |
| 28 | 6.70% | 22.27% | 28.32% | 67.75% |

When the water-soluble silicone macromer was added to water, there was no phase separation. The solutions exhibit from totally optically clear to heavy haziness. From Table 2, it can be seen that the light transmittance of all water-soluble silicone macromer aqueous solutions increased after adding the Triton™ X-100, indicating that the surfactant does increase the water solubility of the water-soluble silicone macromer.

Example 30: Preparing the Silicone Hydrogel Lenses

A mixture comprising a water-soluble silicone macromer, second hydrophilic monomer, crosslinker, solvent (t-amyl alcohol, 5%), blue-tint compound (RB-19, 200 ppm), photo-initiator (Irgacure-819, 0.2%) was prepared.

The mixture was injected into a pair of polypropylene (PP) molds and performed crosslinking and curing reaction under a visible light source, after cured, the lenses were released from the molds and extracted with hot water at 80° C. for 2 hours. The lenses were placed in polypropylene blister filled with Borate buffered saline at pH 7.30, then autoclaved at 125° C. for 30 minutes. These fully processed lenses were then characterized for water contents, oxygen permeability, % elongation and % extractable.

Example 31: Formulation Study—Comparison of the Silicone Macromer

The silicone hydrogel lenses are made of different formulation according to the above manufacturing method and the measurement of water content and oxygen permeability are shown in Table 3.

TABLE 3

| | Silicone hydrogel lenses | | | | | | | |
|---|---|---|---|---|---|---|---|---|
| | 31A | 31B | 31C | 31D | 31E | 31F | 31G | 31H |
| Silicone macromer (Example) | 10 | 6 | 2 | 12 | 16 | 2 | 12 | 24 |
| Formulation Macromer | 65 | 65 | 65 | 65 | 65 | 65 | 65 | 65 |
| (unit:weight) NVP | 25 | 25 | 25 | 25 | 25 | — | — | — |
| DMA | — | — | — | — | — | 25 | 25 | 25 |
| HEMA | 10 | 10 | 10 | 10 | 10 | 10 | 10 | 10 |
| EGDMA | 0.4 | 0.4 | 0.4 | 0.4 | 0.4 | 0.8 | 0.8 | 0.8 |
| TAIC | 0.1 | 0.1 | 0.1 | 0.1 | 0.1 | 0 | 0 | 0 |
| Oxygen permeability (DK) | 56.5 | 50.0 | 47.0 | 75.3 | 51.4 | 53.56 | 59.96 | 64.11 |
| Water content (%) | — | — | 54.2 | 68.1 | — | 52.8 | 66.3 | 69.09 |

From Table 3, all silicone hydrogel lenses have DK more than 50, except lenses 31C, and the lenses 31D have the highest DK 75.3. The silicone hydrogel lenses 31C, 31D, 31F, 31G and 31H have water content in a range of 53-69%.

Example 32: Comparison of the % Extractable of Water and Isopropanol

The silicone hydrogel lenses are made of different formulation according to the above manufacturing method and the measurement of water content, oxygen permeability and % elongation of the silicone hydrogel lenses are shown in Table 4.

TABLE 4

| Silicone hydrogel lenses | | 32A | 32B |
|---|---|---|---|
| Formation (Unit: weight) | Silicone macromer (Example16) | 65 | 65 |
| | DMA | 25 | 17.5 |
| | HEMA | 10 | 17.5 |
| | EGDMA | 0 | 0.6 |
| | TMPTMA | 0.4 | 0.1 |
| Oxygen permeability (DK) | | 49.6 | 51 |
| Water content (%) | | 72.7 | 69.2 |
| Elogation (%) | | 190 | 173 |
| H₂O Extractable (%) | | 13.58% ± 3.09% | 6.58% ± 2.09% |
| IPA Extractable (%) | | 15.68% ± 4.31% | 8.41% ± 2.51% |

The % extractable was measured by taking the dry weight of lens before and after extraction. Dry weight after hydration was made by drying lens in an oven at 70° C. overnight. Isopropanol extraction was done for comparison, lenses were extracted in isopropanol at 45° C. for 2 hours after cured, followed by placed in hot water at 80° C. for 2 hours. From Table 4, it can be seen that the silicone hydrogel lenses 32A and 32B have water content about 70%. The % extractable of hot water and isopropanol are similar, indicating that the silicone hydrogel lenses made of the above formation can be effectively extracted with water only.

Example 33: Formulation Study—Comparison of the Crosslinker

The silicone hydrogel lenses are made of different formulation according to the above manufacturing method and the measurement of % elongation are shown in Table 5.

As shown in Table 5, the silicone hydrogel lenses 33A-33L have good % elongation of at least 150%.

Example 34: Formulation Study—Comparison of the Second Hydrophilic Monomer

The silicone hydrogel lenses are made of different formulation according to the above manufacturing method and the measurement of water content, oxygen permeability and % elongation are shown in Table 6.

TABLE 5

| | | Silicone hydrogel lenses | | | | | | | | | | | |
|---|---|---|---|---|---|---|---|---|---|---|---|---|
| | | 33A | 33B | 33C | 33D | 33E | 33F | 33G | 33H | 33I | 33J | 33K | 33L |
| Macromer (Example) | | 2 | 16 | 16 | 16 | 14 | 14 | 14 | 12 | 26 | 26 | 26 | 28 |
| Formulation | Macromer | 65 | 65 | 65 | 65 | 65 | 65 | 65 | 65 | 65 | 65 | 65 | 65 |
| (Unit:weight) | DMA | 25 | 25 | 25 | 25 | 25 | 25 | 25 | 25 | 25 | 25 | 25 | 25 |
| | HEMA | 10 | 10 | 10 | 10 | 10 | 10 | 10 | 10 | 10 | 10 | 10 | 10 |
| | EGDMA | 0 | 0.6 | 0 | 0 | 0.6 | 0 | 0 | 0 | 0.6 | 0 | 0 | 0.8 |
| | TMPTMA | 0 | 0 | 0.4 | 0 | 0 | 0.4 | 0 | 0 | 0 | 0.4 | 0 | 0 |
| | TEGDMA | 0.4 | 0 | 0 | 0.8 | 0 | 0 | 0.8 | 0.8 | 0 | 0 | 0.8 | 0 |
| Elongation (%) | | 165 | 211 | 176 | 182 | 196 | 220 | 160 | 176 | 176 | 165 | 206 | 182 |

TABLE 6

| | | Silicone hydrogel lenses | | | | | | | | | | |
|---|---|---|---|---|---|---|---|---|---|---|---|
| | | 34A | 34B | 34C | 34D | 34E | 34F | 34G | 34H | 34I | 34J | 34K |
| Formulation Unit:weight) | Silicone macromer (Example 12) | 65 | 65 | 65 | 65 | 65 | 65 | 65 | 65 | 65 | 65 | 65 |
| | DMA | 22.5 | 17.5 | 18.9 | 19.3 | — | — | — | 11.3 | 11.3 | 11.3 | 22.0 |
| | DEA | — | — | — | — | 22.5 | — | — | 11.3 | — | — | — |

TABLE 6-continued

| | Silicone hydrogel lenses | | | | | | | | | | |
|---|---|---|---|---|---|---|---|---|---|---|---|
| | 34A | 34B | 34C | 34D | 34E | 34F | 34G | 34H | 34I | 34J | 34K |
| ACMO | — | — | — | — | — | 22.5 | — | — | 11.3 | — | — |
| NIPAM | — | — | — | — | — | — | 22.5 | — | — | 11.3 | — |
| HEMA | 12.5 | 17.5 | 13.54 | 10.7 | 12.5 | 12.5 | 12.5 | 12.5 | 12.5 | 12.49 | 12.5 |
| MAA | — | — | — | — | — | — | — | — | — | — | 0.5 |
| EGDMA | 0.6 | 0.6 | 0.6 | 0.6 | 0.6 | 0.6 | 0.6 | 0.6 | 0.6 | 0.6 | 0.6 |
| TMPTMA | 0.1 | 0.1 | 0.1 | 0.1 | 0.1 | 0.1 | 0.1 | 0.1 | 0.1 | 0.1 | 0.1 |
| Oxygen permeability (DK) | 70.6 | 58.8 | 62.1 | 68 | 52.0 | 53.1 | 49.6 | 52.5 | 57.6 | 55.5 | 63.3 |
| Elongation (%) | 180 | 220 | 196 | 193 | 117 | 117 | 126 | 160 | 164 | 169 | 155 |
| Water content (%) | 68.89 | 66.92 | 67.81 | 68.29 | 66.48 | 67.48 | 68.29 | 67.48 | 66.4 | 66.68 | 69.9 |

Example 35: Water Loss Test of the Silicone Hydrogel Lenses

Under 22° C. and 50% relative humidity, the silicone hydrogel lenses were placed in a sample pan sat on the top of weighing stand and weighed at 0, 5, 10, 15, 20, 25, 30 and 60 minutes and recorded. The comparison of water loss of the silicone hydrogel lenses 34A-34C from this invention, Clariti, hydrogel lenses Omafilcon B and Etafilcon A on the market are shown in FIG. 1 and Table 7.

TABLE 7

| Lenses | Water content (%) | Weight loss after 10 minutes (%) | Weight loss after 30 minutes (%) |
|---|---|---|---|
| 34A | 68.90% | 7.19% | 19.42% |
| 34B | 66.90% | 7.94% | 22.01% |
| 34C | 67.80% | 6.96% | 19.76% |
| Omafilcon B | 62% | 8.25% | 23.69% |
| Etafilcon A | 58% | 9.69% | 26.59% |
| Clariti | 55% | 9.29% | 27.39% |

Please refer to FIG. 1 and Table 7. FIG. 1 shows the trend of lens weight loss in 1 hour water loss test for the silicone hydrogel lenses of this invention and the commercial silicone hydrogel lenses and hydrogel lenses. Table 7 shows the % weight loss of the lenses at 10 and 30 minutes. From FIG. 1 and Table 7, the water content of the commercial lenses and the lenses from this invention is similar. Among the three commercial lenses, Omafilcon B has the lowest weight loss (%), even though it has the highest water content, which means that the water loss is the least, and is consistent with its claim as the only anti-dryness claim received from FDA. Etafilcon A is the most popular daily disposable hydrogel lens and known as the best water-preserving lens. Clariti is manufactured by a thermal curing process and processed with water extraction. Silicone hydrogel lenses 34A-34C of this invention have higher water contents than above three commercial lenses, but still showed lower weight loss % than Omafilcon B, indicating that it has superior "anti-dryness" behavior.

The oxygen permeability of general silicone hydrogel lenses will decrease with the increase of the water content. When the water content of lens is about 55%, the oxygen permeability is about 60 DK. When the water content of the lens is greater than 60%, the oxygen permeability will further decrease. The silicone hydrogel lens disclosed in this invention is made of water-soluble silicone macromer and has a high water content of 55-70% as compared with a silicone hydrogel lens made of hydrophobic silicone macromer. And the oxygen permeability of the silicone hydrogen lens disclosed in the present invention is greater than 60 Dk. In addition, the silicone hydrogel lens in the present invention has a lower weight loss in the water loss test as compared with commercial hydrogel lens and silicone hydrogel lens which has water content similar to the lens of this invention.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A silicone hydrogel composition, comprising:
a water-soluble silicone macromer in the amount of 50-80 wt % based on the total weight of the silicone hydrogel composition, wherein the water-soluble silicone macromer has a structure presented by formula (1) below:

$$E\text{-}(M_1)_x\text{-}(M_2)_y, \qquad \text{formula (1);}$$

wherein $M_1$ is a repeating unit comprises

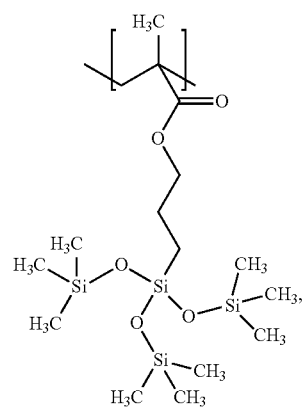

formula (2)

formula (3)

formula (4)

formula (5)

formula (6)

formula (7)

formula (8)

formula (9)

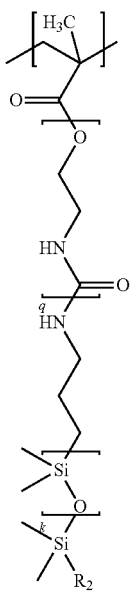

formula (9), or a combination thereof, wherein formula (8) and formula (9) has a number-averaged molecular weight of less than 1500, p is an integer of 0-4, q is 0 or 1, k is an integer of 4-20, and $R_2$ is C1-C10 alkyl group;

$M_2$ is a repeating unit comprises formula (12)

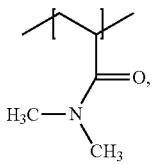

formula (13)

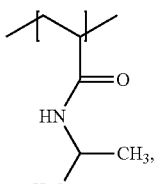

formula (14)

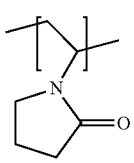

formula (15)

formula (16)

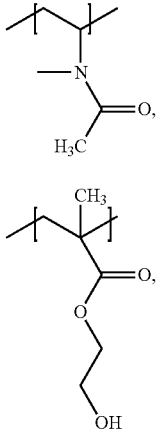

formula (17)

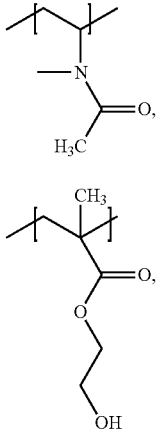

formula (18)

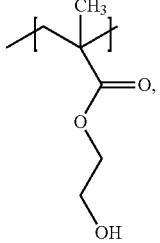

formula (19)

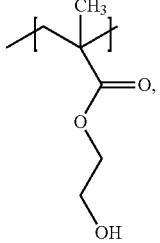

of molecular weight less than 1000, or a combination thereof, wherein a is an integer of 1-21, and a weight ratio of $(M_1)_x$ to $(M_2)_y$ is from 30:70 to 50:50;

E is a terminal group comprises formula (20)

formula (21)

formula (22)

, or

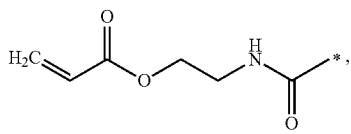

formula (23)

wherein a symbol "*" in formula (20)-(23) indicates a position to be linked to $M_1$;

x is an integer of 1-20;

y is an integer of 1-20;

a number-average molecular weight (Mn) of the water-soluble silicone macromer ranges from 2000 to 5000; and an aqueous solution composed of 0.5 wt % of the water-soluble silicone macromer and water has a light transmittance of greater than 20% at a wavelength of 450 nm;

a hydrophilic monomer in the amount of 19-50 wt % based on the total weight of the silicone hydrogel composition;

a crosslinker in the amount of 0.1-1.5 wt % based on the total weight of the silicone hydrogel composition;

an initiator in the amount of 0.1-1 wt % based on the total weight of the silicone hydrogel composition; and an organic solvent.

2. The silicone hydrogel composition of claim 1, wherein the hydrophilic monomer is selected from the group consisting of N,N-dimethyl acrylamide, N,N-diethyl acrylamide, N-isopropyl acrylamide, N-vinyl pyrrolidone, N-vinyl-N-methyl acetamide, 2-hydroxyethyl methacrylate, 3-hydroxypropyl methacrylate, glycerol methacrylate, methacrylic acid, acrylic acid, 2-methacryloyloxyethyl phosphorylcholine, and a combination thereof.

3. The silicone hydrogel composition of claim 1, wherein the crosslinker is selected from the group consisting of ethylene glycol dimethacrylate, triethylene glycol dimethacrylate, tetraethylene glycol dimethacrylate, trimethylolpropane trimethacrylate, pentaerythritol tetramethacrylate, bisphenol A dimethacrylate, methylenebis(methacrylamide), divinyl ether, divinyl sulfone, divinylbenzene, trivinylbenzene, triallyl isocyanurate, triallyl phthalate, diallyl phthalate, allyl methacrylate, and a combination thereof.

4. The silicone hydrogel composition of claim 1, wherein the initiator is a thermal initiator or a photo initiator.

5. The silicone hydrogel composition of claim 1, wherein the organic solvent is selected from the group consisting of n-butanol, t-butanol, n-pentyl alcohol, t-amyl alcohol, n-hexanol, 3-methoxy-1-butanol, methyl cabitol, ethyl carbitol, propyl carbitol, butyl carbitol and a combination thereof.

6. The silicone hydrogel composition of claim 1, further comprising a tint monomer or a tint compound.

7. The silicone hydrogel composition of claim 1, further comprising a UV-blocking monomer, and the UV-blocking monomer is a benzotrizole-type monomer.

* * * * *